US006766309B1

(12) United States Patent
Cheng et al.

(10) Patent No.: US 6,766,309 B1
(45) Date of Patent: Jul. 20, 2004

(54) METHOD AND SYSTEM FOR ADAPTING A NETWORK APPLICATION BASED ON CLASSIFYING TYPES OF COMMUNICATION LINKS USING FUZZY LOGIC

(76) Inventors: Liang Cheng, 855 Davidson Rd., Piscataway, NJ (US) 08854; Ivan Marsic, 170 Windsong Cir., East Brunswick, NJ (US) 08816

(*) Notice: Subject to any disclaimer, the term of this patent is extended or adjusted under 35 U.S.C. 154(b) by 510 days.

(21) Appl. No.: 09/614,294

(22) Filed: Jul. 12, 2000

Related U.S. Application Data

(60) Provisional application No. 60/143,723, filed on Jun. 14, 1999.

(51) Int. Cl.[7] .............................. G06G 7/00; G06F 15/18
(52) U.S. Cl. ....................... 706/3; 706/4; 706/8; 700/50
(58) Field of Search ................................ 706/1, 3, 4, 8, 706/52, 900; 370/230, 235; 700/50; 455/436, 438

(56) References Cited

U.S. PATENT DOCUMENTS

| | | | |
|---|---|---|---|
| 5,245,695 A | * 9/1993 | Basehore | 706/4 |
| 5,459,816 A | * 10/1995 | Basehore et al. | 700/50 |
| 5,633,888 A | 5/1997 | Stewart | 375/132 |
| 5,687,290 A | 11/1997 | Lewis | 706/45 |
| 5,710,868 A | * 1/1998 | Basehore | 706/4 |
| 5,767,785 A | * 6/1998 | Goldberg | 340/7.43 |
| 5,812,526 A | * 9/1998 | Chang et al. | 370/230 |
| 5,822,301 A | 10/1998 | Arnold et al. | 370/238 |
| 5,822,740 A | * 10/1998 | Haissig et al. | 706/3 |
| 5,841,948 A | * 11/1998 | Ota et al. | 706/52 |
| 5,901,362 A | 5/1999 | Cheung et al. | 455/525 |
| 5,956,634 A | 9/1999 | Otterson et al. | 455/410 |
| 6,088,732 A | * 7/2000 | Smith et al. | 709/229 |
| 6,141,553 A | * 10/2000 | Fernandez et al. | 455/436 |
| 6,487,500 B2 | * 11/2002 | Lemelson et al. | 701/301 |

OTHER PUBLICATIONS

Chang et al., "Traffic Control in an ATM Network Using Fuzzy Set Theory", Proceedings of the 13th Networking for Global Communications Conference, vol. 3, pp. 1200–1207, Jun. 1994.*
Srivastava et al., "Access Algorithm for Packetized Wireless Transmission in the Presence of Cochannel Interference", IEEE Transaction on Vehicular Technology, vol. 47, No. 4, Nov. 1998.*
Bing et al., "Fuzzy Flow Detection For IP Cut–Through", International Conference on Communication Technology, Oct. 199.*
Chang et al., "Fuzzy/Neural Congestion Control for DS–CDMA/FRMA Cellular Systems", 1999 IEEE International Conference o Communications, vol. 1, pp. 349–353, Jun. 1999.*

(List continued on next page.)

*Primary Examiner*—Wilbert L. Starks, Jr.
*Assistant Examiner*—Kelvin Booker
(74) *Attorney, Agent, or Firm*—Mathews, Collins, Shepherd & Mckay, P.A.

(57) ABSTRACT

In hybrid communication environments, in which both the wired and wireless communication links in a communication channel can exist in a communication channel, performance of a quality-of-service (QoS) provision can be enhanced if the application knows whether there exist wireless links in the communication channel and adapts its behavior accordingly. The system of the present invention includes a fuzzy reasoning engine which uses quality of service parameters of a communication channel relating to network statistical patterns as fuzzy inputs, and determines a confidence about the existence of wireless links in the communication channel as the output. The quality of service parameters can include a mean value and variance of round trip time of packets communicating between two communication entities over the comunication channel. Based on the determination of the type of link, the application can be adapted in order to provide a predetermined quality of service.

23 Claims, 12 Drawing Sheets

OTHER PUBLICATIONS

Srivastava et al., "Packetized Wireless Access For Data Traffic in Frequency Reuse Environments", 7th IEEE International Symposium on Personal, Indoor and Mobile Radio Communications, vol. 3, pp. 1150–1154, Oct. 1996.*

Catania et al., "A Comparative Analysis of Fuzzy Versus Conventional Policing Mechanisms for ATM Networks", IEEE/ACM Transactions on Networking, vol. 4, No. 3, Jun. 1996.*

Cheng et al., "Design of a Fuzzy Traffic Controller for ATM Networks", IEEE/ACM Transactions on Networking, vol. 4, No. 3, Jun. 1996.*

Cheng et al., "A QoS–Provisioning Neural Fuzzy Connection Admission Controller for Multimedia High–Speed Networks", IEEE/ACM Transactions on Networking, vol. 7, No. 1, Feb. 1999.*

Abuelyaman et al., "On the Optimization of QoS in ATM Networks", Proceedings of the 36th Annual Southeast Regional Conference, pp. 111–120, Apr. 1998.*

Keshav, S., "A Control–Theoretic Aproach to Flow Control", Proceedings of the Conference on Communications Architecture an Protocols, pp. 3–15, Aug. 1991.*

Perez–Neira et al., "Fuzzy Logic for Fobust Detection in Wireless Communications", The $8^{th}$ IEEE International Symposium on Personal, Indoor and Mobile Radio Communications, vol. 3, pp. 1145–1149, Sep. 1997.*

Aspinall, D., "Subtyping with Singleton Types", Computer Science Logic, 1994, pp. 1–15.*

Bouchon–Meunier et al., "On the Choice of Membership Functions In a Mamdani–Type Fuzzy Controller", First Online Worksho on Soft Computing, Aug. 1996.*

Huertas et al., "Serial Architecture for Fuzzy Controllers: Hardware Implementation Using Analog/Digital VLSI Techniques", Second International Conference on Fuzzy Logic and Neural Networks (IIZUKA'92), Jul. 1992, vol. 1, pp 535–538.*

Lindskog et al., "Ensuring Certain Physical Properties in Black Box Models by Applying Fuzzy Techniques", SYSID '97, Apr. 1997.*

Bensaou et al., "Estimation of the Cell Loss Ratio in ATM Networks with a Fuzzy System and Application to Measurement–Bases Call Admission Control", IEEE/ACM Transactions on Networking, vol. 5, No. 4, Aug. 1997.*

Jin et al., "Functional Equivalence Between Neural Networks and Fuzzy Systems with Sinusoidal Membership Functions", Proceedings of ISUMA–NAFIPS '95, Sep. 1995.*

Charles E. Perkins, "Mobile IP: Design Principles and Practices,", Addison–Wesley: Reading, 1997.

L.A. Zadeh, "Fuzzy Sets," Information and Control, vol. 8, pp. 338–353, 1965.

S. Corson and J. Macker, "Mobile ad hoc Networking (MANET): Routing Protocol Performance Issues and Evaluation Considerations," Request for Comments (RFC) 2501, Jan. 1999.

J. Broch, D.A. Maltz, D.B. Johnson, Y.C. Hu and J. Jetcheva, "A Performance Comparison of Multi–hop Wireless ad hoc Network Routing Protocols," Proceedings of the 4th Annual ACM/IEEE International Conference on Mobile Computing and Networking, ACM, Dallas, TX, Oct. 1998.

K. Chandran, S. Raghunathan, S. Venkatesan and R. Prakash, "A Feedback Based Scheme for Improving TCP Performance in ad–hoc Wireless Networks," Proceedings of the 18th International Conference on Distributed Computing Systems (ICDCS '98), Amsterdam, May 26–29, 1998.

M. Gerla, R. Bagrodia, L. Zhang, K. Tang, L. Wang, "TCP Over Wireless Multihop Protocols: Simulation and Experiments," Proceedings of IEEE ICC '99, Vancouver, Canada, Jun. 6–10, 1999.

L.A. Zadeh, "Fuzzy Logic=Computing With Words," IEEE Trans. on Fuzzy Systems, vol. 4, No. 2, pp. 104–111, 1996.

D.L. Mills, "Internet Delay Experiments," Request for Comments (RFC) 889, Dec. 1983.

P. Karen and C. Partridge, "Improving Round–trip Time Estimates in Reliable Transport Portocols," ACM Trans. on Computer Systems, vol. 9, No. 4, pp. 364–373, Nov. 1991.

G.C. Mouzouris, J.M. Mendel, "Nonsingleton Fuzzy Logic Systems: Theory and Application," IEEE Trans. on Fuzzy Systems, vol. 5, No. 1, pp. 56–62, 1997.

* cited by examiner

METHOD AND SYSTEM FOR ADAPTING A NETWORK APPLICATION BASED ON CLASSIFYING TYPES OF COMMUNICATION LINKS USING FUZZY LOGIC

This patent application claims priority of U.S. Provisional Serial No. 60/143,723 filed Jun. 14, 1999 entitled "Fuzzy Reasoning For Wireless Awareness", the disclosure of which is hereby incorported by reference.

BACKGROUND OF THE INVENTION

1. Field of the Invention

The present invention relates to determining at least one type of link in a communication channel by evaluating at least one network statistical parameter using fuzzy logic.

2. Description of the Related Art

Portable computing devices, such as personal digital assistants (PDAs), palmtops, handheld personal computers (PCs), pen-based PCs, and laptops, have become popular in recent years. In addition, with the development of wireless communication technologies, wireless products ranging from local area networks (LAN) to wide area networks (WAN) are available commercially. Accordingly, wireless computing, wireless communication, and wireless networks are becoming common in the daily life. This naturally leads to hybrid communication environments in which both the wired and wireless communication links exist.

The Mobile Internet protocol has been developed as a standard for provisioning the current wired Internet with wireless accessibility, see C. E. Perkins, *Mobile IP: Design Principles and Practice,* Addison-Wesley: Reading, 1997. Mobile ad hoc networks (MANETs) have also been described, see Corson et al., *"Mobile Ad Hoc Networking (MANET): Routing Protocol Performance Issues and Evaluation Considerations,"* Request for Comments (RFC) 2501, January 1999. Research efforts have focused on IP protocol layer problems such as mobile IP and routing protocols in MANET, as described in Broch et al., *"A Performance Comparison of Multi-Hop Wireless Ad Hoc Network Routing Protocols,"* In Proceedings of the Fourth Annual ACM/IEEE International Conference on Mobile Computing and Networking, ACM, Dallas, Tex., October 1998, and on the transport layer, such as TCP performance in wireless networks, see Chandran et al., *"A Feedback Based Scheme for Improving TCP Performance in Ad-Hoc Wireless Networks,"* In *Proceedings of the 18th International Conference on Distributed Computing Systems (ICDCS'98),* Amsterdam, May 26–29, 1998, and Gerla et al., *"TCP Over Wireless Multihop Protocols: Simulation and Experiments,"* In *Proceedings of IEEE ICC'99,* Vancouver, Canada, Jun. 6–10, 1999.

Fuzzy logic was first introduced by L. A. Zadeh in 1965, as described in L. A. Zadeh, *"Fuzzy Sets,"* Information and Control, Vol. 8, pp. 338–353, 1965 and it has since been widely used to construct intelligent systems. Fuzzy logic with its intrinsic nonlinearity has similarity with the reasoning conducted by human beings, such as computing with words, see L. A. Zadeh, *"Fuzzy Logic-Computing With Words,"* IEEE Trans. on Fuzzy Systems, Vol. 4, No. 2, pp. 104–111, 1996. A key feature of fuzzy logic is that it can deal with the uncertainties that exist in physical systems.

U.S. Pat. No. 5,687,290 describes an apparatus and method for monitoring and controlling a communications network using fuzzy logic. The apparatus includes a network monitor coupled to the communications network and provides numeric data representative of at least one operating parameter of the communications network. A fuzzifier module is coupled to the network monitor and to convert the numeric data into fuzzy input data. A fuzzy inference engine is coupled to the fuzzifier module and processes the fuzzy input data according to at least one fuzzy rule to provide fuzzy output data representative of control actions to affect a desired state of the communications netowrk. A defuzzifier module is coupled to the fuzzy inference engine and converts the fuzzy output data into numeric data which may be used by a network controller to control at least one network parameter. The apparatus may also include a user interface and a display to allow the fuzzy input data and the fuzzy output data to be displayed to a user.

U.S. Pat. No. 5,822,301 describes a method for evaluating performance of communication links with fuzzy logic. Two possible lines are thereby evaluated with fuzzy logic with respect to their performance, their time behavior and their dependability aspects. The intermediate variables derived therefrom are processed with a principal rule set to form a weighting factor for the respective line. A routing method that is to define the shortest path for a communication connection employs this weighting factor in order to determine the corresponding connection.

Values of round-trip time (RTT) can be used to identify characteristics of communication links. Generally speaking, RTT is the interval between the sending of a packet and receiving its acknowledgement and includes both network propagation delays, such as router-queue delay and link delay, and host-processing delay, such as the time spent at the sender and receiver processing the packet and acknowledgement. Typically, the propagation delay is a significant contributor to the round-trip time. It is described in *"Improving Round-Trip Time Estimates in Reliable Transport Protocols,"* ACM Trans. on Computer Systems, Vol. 9, No. 4, pp. 364–373, November 1991 that RTTs via wide area networks with wired links show Poisson distribution characteristics.

Measurements of round trip time (RTT) are used in TCP. TCP dynamically sets an appropriate retransmission timeout value based on the RTT measurement. A conventional method for measuring RTT in TCP is as follows. Every time TCP sends a datagram, it records the time instant. When an acknowledgement (ACK) for that datagram arrives, TCP again gets the time instant and takes the difference between the two times as the current RTT value. This method has the disadvantage referred to as the retransmission ambiguity problem. In the method, an ACK acknowledges the receipt of a datagram instead of a transmission. Accordingly, whenever a datagram is retransmitted and then an ACK is received at the sender, it is impossible to determine if the ACK should be associated with the first or the second transmission of the datagram. One solution to the retransmission ambiguity problem has been described by Karn et al. in *"Improving Round-Trip Time Estimates in Reliable Transport Protocols,"* ACM Trans. on Computer Systems, Vol. 9, No. 4, pp. 364–373, November 1991 in which the retransmission ambiguity problem is solved by simply not taking samples of RTT whenever TCP retransmits a datagram. This method only measures RTT for datagrams that have been sent without retransmission.

It is desirable to provide a method for evaluating statistical properties of network quality of service parameters using fuzzy logic for determining if communication links in a communication channel are wired links or include a wireless link which results can be used to adapt network based applications.

SUMMARY OF THE INVENTION

It has been found that wired links and wireless links have different network statistical patterns. The system of the present invention includes a fuzzy reasoning engine which uses quality of service parameters relating to the network statistical patterns as fuzzy inputs, such as a mean value and variance of a round trip time, and determines a confidence about the existence of wireless links in the communication channel as the output. The system can be used for adaptive application scenarios. In a unicast client-server application scenario, the server provides different services to different clients depending on whether a wireless link was detected during the connection establishment phase. In a multicast scenario, a new multicast session is created by a session manager in addition to the original one depending on whether a wireless link was detected during a request to join the multicast session. The new multicast session carries lower data traffic from and to the participants whose communication path includes the wireless link(s).

The invention will be more fully described by reference to the following drawings.

DESCRIPTION OF THE INVENTION

Figure 1:
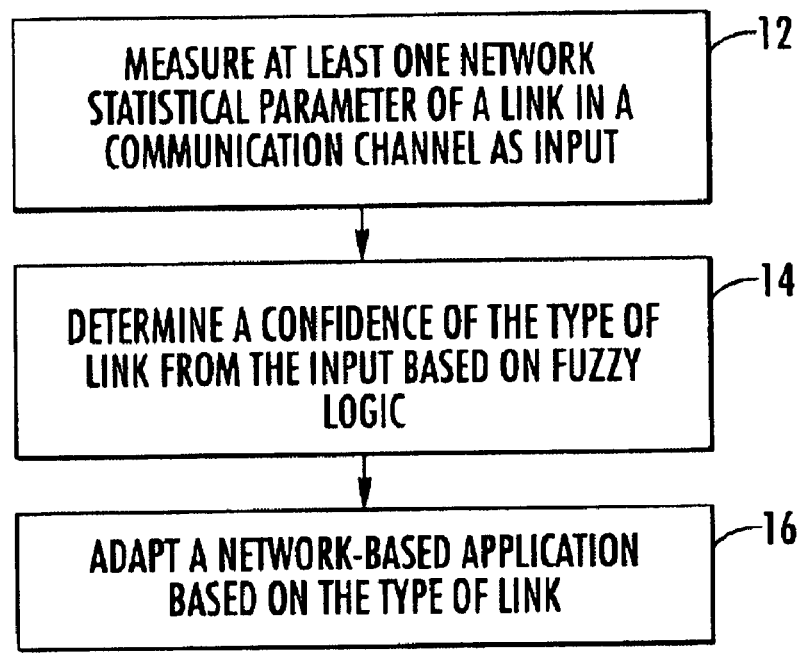
FIG. 1 is a flow diagram of a method of adapting a network-based application according to a determination of at least one type of communication link in a communication channel.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flow diagram of a method of adapting a network based application according to a determination of at least one type of link in a communication channel 10 in accordance with the teachings of the present invention. "Communication channel" is used in this disclosure to refer to any type of software/hardware data transmission reception medium. By "communication link" is meant a connection between two communication entities. One or more communication links are used to form the communication channel. Each communication link can be a wired link or a wireless link.

In step 12, a statistical property of at least one network quality of service parameter of the communication channel is measured. The measured quality of service parameter is used as input data. For example, the network quality of service parameter can be a plurality of round trip time (RTT) measurements of packets sent and received over the communication channel, jitter measurements of the communication channel or packet loss rate. In step 14, a confidence of a type of communication link in the communication channel is determined from the input data based on fuzzy logic. Fuzzy logic is known in the art as described in L. A. Zadeh, *Fuzzy sets,* Information and Control, Vol. 8, pp. 338–353, 1965 and U.S. Pat. No. 5,687,290 which are incorporated herein by reference. For example, the confidence determined can relate to the degree of certainty that fuzzy logic was able to determine that the communication channel includes a type of communication link, such as either a wireless communication link or a wired communication link. A network based application is adapted based on the type of communication link determined in step 16.

Figure 2:
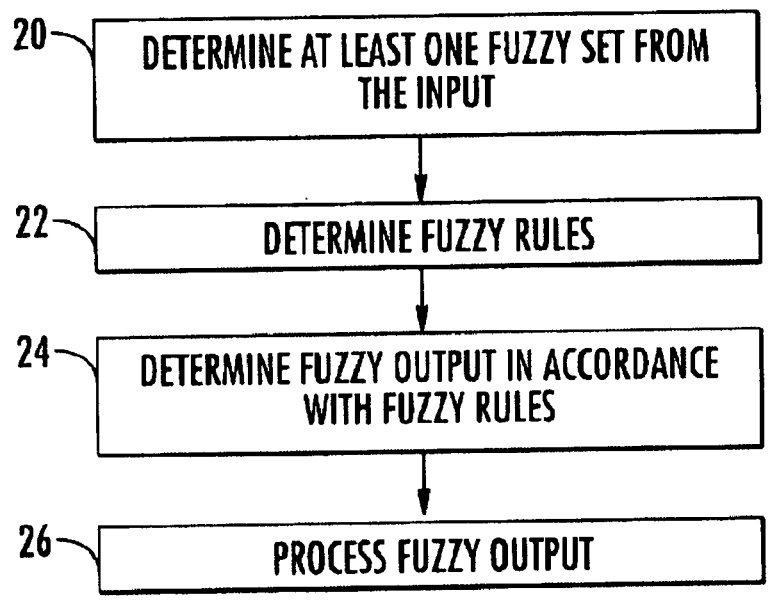
FIG. 2 is a flow diagram of a method for implementing fuzzy logic.

FIG. 2 is a flow diagram of a method for implementing step 14. In step 20, at least one fuzzy set is determined from the input data. Fuzzy sets have been interpreted as a membership function $\mu_x$ associated with each element x in the universe of discourse U with a number $\mu_x(x)$ in the interval [0,1] as:

$$\mu_x: U \rightarrow [0,1] \qquad (1)$$

A fuzzifier is used to map the input representing crisp data X∈U into a fuzzy set X∈U, and $\mu x$ gives the degree of membership of x to the fuzzy set X, i.e., a real number in the range [0,1] where 1 denotes full membership and 0 denotes no membership. Fuzzy sets can be considered as an extension of classical crisp sets of data since crisp sets only permit full membership or no membership while fuzzy sets permit partial membership. The fuzzy set can be expressed in a defined description language that describes behavior of the input data. For example, the fuzzy set can be expressed in fuzzy linguistic variables. Fuzzy linguistic variables are variables that use fuzzy linguistic values rather than numeric values to describe the magnitude of the fuzzy linguistic variable.

In step 22, fuzzy rules are determined to determine the degree of membership of the input data in the fuzzy set using the fuzzifier. Generally, there are two kinds of fuzzifiers referred to as a "singleton fuzzifier" and a "nonsingleton fuzzifier", see G. C. Mouzouris, J. M. Mendel, "Nonsingleton Fuzzy Logic Systems: Theory and Application," *IEEE Trans. on Fuzzy Systems*, Vol. 5, No. 1, pp. 56–62, 1997, hereby incorporated by reference into this application. In the singleton fuzzifier, the crisp data x∈U is mapped into the fuzzy set X with support $x_i$, where $\mu_x(x_i)=1$ for $x_i=x$ and $\mu_x(x_i)=0$ for $x_i \neq x$. In the nonsingleton fuzzifier, the crisp data x∈U is mapped into a fuzzy set X with support $x_i$, where $\mu_x(x_i)=1$ for $x_i=x$ and decreases while moving away from $x_i=x$. Accordingly, the nonsingleton fuzzifier implies that the given input x is the most likely to be the correct value of all the values in its immediate neighborhood, and because of the uncertainties in the input, neighboring points are also likely to be the correct values, but to a lesser degree. The shape of the membership function can be determined based on an estimate of the uncertainties present. Preferably, the membership function is chosen to be symmetric about x since the effect of uncertainties is most likely to be equal on all data. In alternative embodiments, other shapes of membership functions, such as nonsymmetric membership functions, can be used.

Fuzzy rules connect input variables to output variables. Each fuzzy rule in the rulebase has p antecedent clauses that define conditions and one consequent clause that defines the corresponding action. A rule with q consequent can be decomposed into q rules, each having the same antecedents and one different consequent. The general form of the $t^{th}$ fuzzy rule in the rulebase is:

$R^1$: IF $x_1$ is $F_1^1$ and $x_2$ is $F_2^1$ . . . and $x_p$ is $F_p^1$

THEN y is $G^1$ (2)

where $F_k^1$ and $G^1$ are fuzzy sets associated with the input data and output fuzzy linguistic variables $X_k$ and y, k=1, . . . , p. In step 24, a confidence of fuzzy output data is determined in accordance with the fuzzy rules. The information embedded in the fuzzy rules can be numerically processed by using fuzzy reasoning. Fuzzy reasoning strategies can include extracting expertise from domain experts and other sources. In step 26, fuzzy output data can be optionally processed with a defuzzifier to map fuzzy output data back into crisp data.

Figure 3:
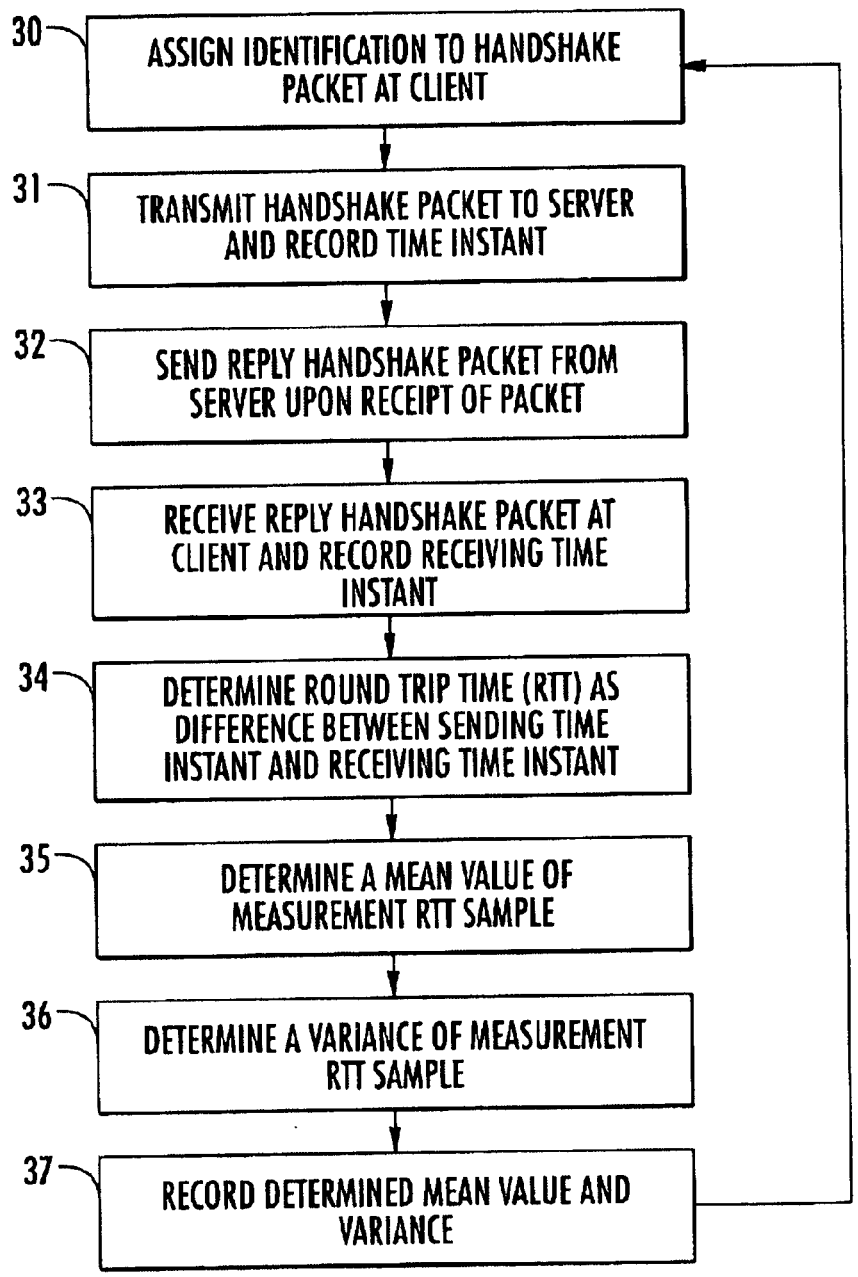
FIG. 3 is a flow diagram of a method for measuring round trip time (RTT) and related statistical parameters.

FIG. 3 illustrates a method for measuring round trip time (RTT). The statistical properties of the RTT can be defined as a quality of service parameter of the communication link in the communications channel. In step 30, an identification is assigned to a handshake packet to be sent from a first communication entity to a second communication entity, such as from a client to a server, over the communication channel. Client/server arrangements are known in the art and are used for many applications such as software processing and Internet applications. For example, the identification can be a unique integer, i. In step 31, the packet is transmitted to the server, the starting time instant, $t_s$, is recorded and a timer is started with timeout value $T_o$. In step 32, upon receiving the handshake packet, the server sends a reply handshake packet that is the same as the received handshake packet. Accordingly, the reply handshake packet has the same identification assigned in step 30.

In step 33, the client receives the reply handshake packet, records the receiving time instant, $t_r$, and stops the timer for the identification. In step 34, if the timer time out value, $T_o$, has not been reached, the difference between the starting time instant, $t_s$, and receiving time instant, $t_r$, is computed. The difference is the RTT, represented by $t_i$. If the timeout value has been reached, the RTT, $t_i$, is set to timeout value, $T_o$. Generally, the RTT, $t_i$, value is in the range from 0 to infinite milliseconds. Typically, conventional systems include timers such as a connection timer and a retransmission timer in connection-oriented applications in order to deal with the case of packet loss, i.e., RTT equals infinity. Accordingly, it is assumed that $t_i$ is constrained to [0, $T_o$] without the loss of generality. Preferably, handshake packets are sent in a stop-and-wait fashion rather than all at once to measure RTT and every packet gets processed immediately as received at the server, without being delayed in a buffer. The method for measuring RTT in the present invention is packet-ID-transmission-oriented instead of sequence-number-datagram-oriented as in conventional TCP.

In step 35, a mean value, t, of the measured RTTs is determined from the collected RTT measurement samples, n, by:

$$t = \frac{1}{n}\sum_{i=1}^{n} t_i \qquad (3)$$

In step 36, a variance of the measured RTTs, $\delta_t$, is determined from the collected RTT measurement samples by the biased estimation:

$$\delta_t = \sqrt{\frac{1}{n}\sum_{i=1}^{n}(t_i - t)^2} \qquad (4)$$

In step 37, the determined mean value, t, and determined variance, $\delta_t$, are recorded, for example, the values can be recorded, in a database. Steps 30–37 can be repeated a predetermined number of times, Maxtimes, at various time instances to represent a RTT measurement sample. For example, steps 30–37 can be repeated once every three seconds.

It has been found that the mean value and variance of RTTs between two communication entities connected via wired links in a communication channel are small, while the mean value and variance are relatively large when wireless links are included in the communication channel. To illustrate the idea, a series of experiments were conducted in which the client and the server communicate either through the Internet or a local area network (LAN) over either one or more wired communication links or one or more wireless communication links which can be optionally combined with wired communication links. In the Internet example, the geographic distance between the client and server was about 500 miles and the Internet distance was 9 hops.

Figure 4:
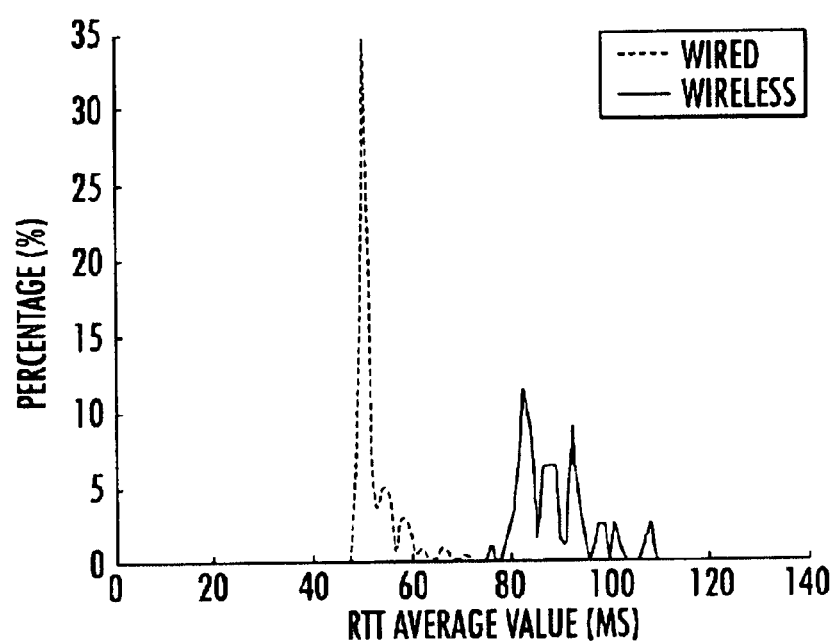
FIG. 4 is a graph of a distribution of a RTT mean value for an Internet session of a communication channel having wired communication links in comparison with a communication channel having wireless communication links.
Figure 5:
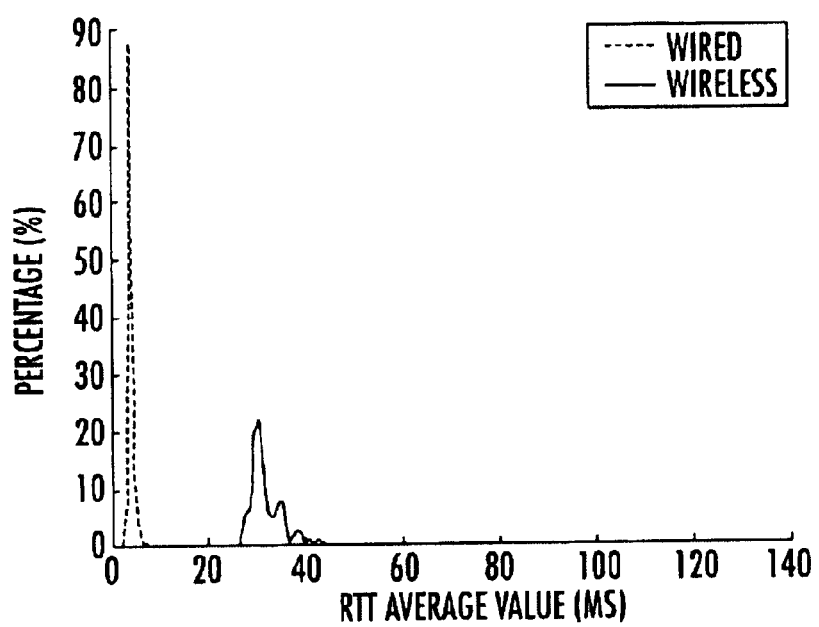
FIG. 5 is a graph of a distribution of a RTT mean value for a LAN session of a communication channel having wired communication links in comparison with a communication channel having wireless communication links.
Figure 6:
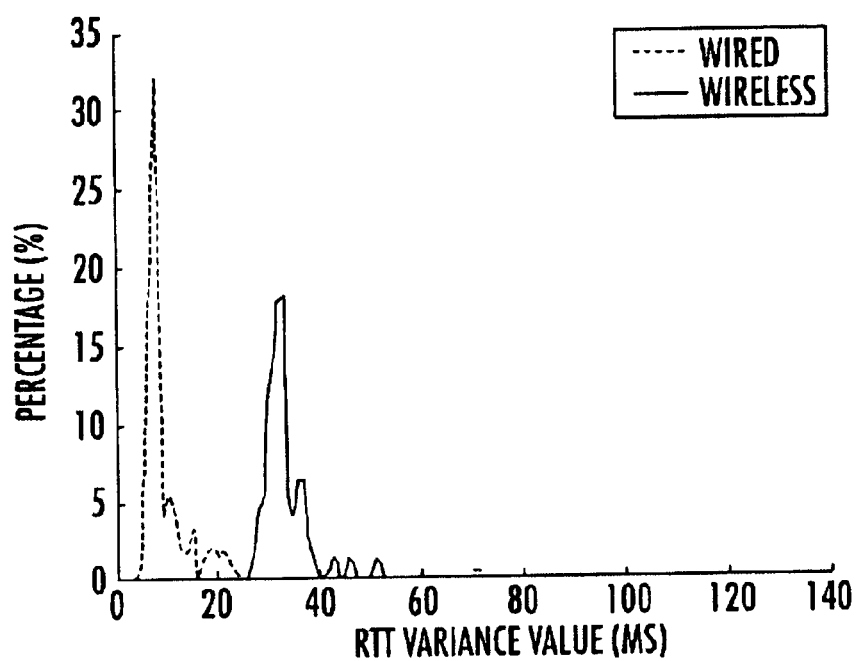
FIG. 6 is a graph of a distribution of a RTT variance for an Internet session of a communication channel having wired communication links in comparison with a communication channel having wireless communication links.
Figure 7:
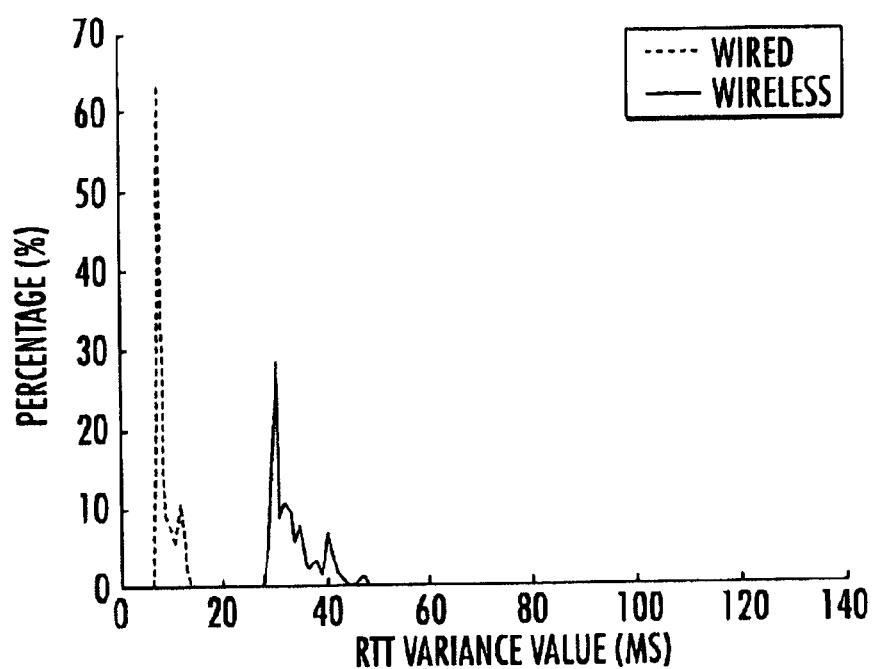
FIG. 7 is a graph of a distribution of a RTT variance for a LAN session of a communication channel having wired communication links in comparison with a communication channel having wireless communication links.

FIG. 4 illustrates results of a distribution of the RTT mean for an Internet session of a communication channel with wired links and a communication channel with wireless links. FIG. 5 illustrates results of a distribution of the RTT mean for a LAN session of a communication channel with wired links and a communication channel with wireless links. FIG. 6 illustrates results of a distribution of the RTT variance for an Internet session of a communication channel with wired links and a communication channel with wireless links. FIG. 7 illustrates results of a distribution of the RTT variance for a LAN session of a communication channel with wired links and a communication channel with wireless links.

According to FIGS. 4 and 5, the distributions of the mean value (or average) of RTTs are very different in the communication channel having wired communication links and the communication channel having wireless communication links. First, the mean value in the wired case is smaller than that in the wireless case and there is little overlap between their distributions. Second, the shape of the distribution in the wired case is more pulse-like, unlike the wireless case, so that it can be deduced that the RTT variance in the wired case is smaller than in the wireless case. FIGS. 6 and 7 illustrate that the variance in the wired case is smaller than in the wireless case. The RTT variances of both the Internet and LAN sessions having wired communication links are small while the variance of both the Internet and LAN sessions having wireless communication links are relatively large. Accordingly, if the RTT values collected by the application show an abnormal pattern such as large mean value and variance, then the application can deduce the existence of one or more wireless links.

Figure 8:
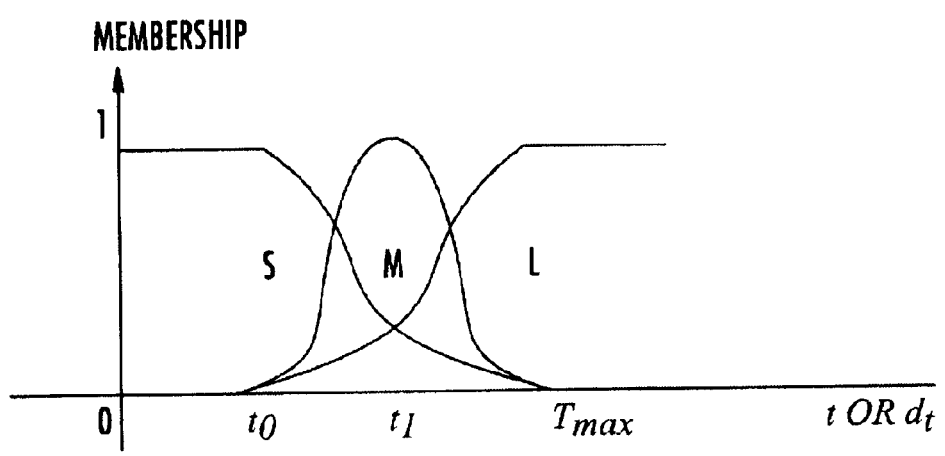
FIG. 8 is a graph illustrating the degree of membership of the fuzzy input variables of the RTT mean and RTT variance in the fuzzy linguistic values of small, S, medium, M, and large, L.

Mean value, t, and variance, $\delta_t$, can be used as a network statistical parameter input in step 12, of FIG. 1. The discourse of the input variables t and $\delta_t$ is $[0, T_{max}]$. A Gaussian membership function $\mu_x(x_i) = \exp[-(x-x_i)^2/2\sigma^2]$ is used in step 14 of FIG. 1, where the variance $\sigma^2$ reflects the width (spread) of $\mu_x(x_i)$. Accordingly, larger values of the spread of the above membership function imply that more uncertainties are anticipated to exist in the given input data. In step 20 of FIG. 2, discourses of the fuzzy input variables t and $\delta_t$ can be divided into three fuzzy sets which are shown in FIG. 8. The corresponding fuzzy linguistic variables are small, S, medium, M, and large, L. The set of the fuzzy linguistic variables for fuzzy input t and $\delta_t$ can be denoted by the following:

$$S(t) = \{S_t, M_t, L_t\} = \{F_t^1, F_t^2, F_t^3\} \quad (5)$$

$$S(\delta_t) = \{S_\delta, M_\delta, L_\delta\} = \{F_\delta^1, F_\delta^2, F_\delta^3\} \quad (6)$$

Figure 9:
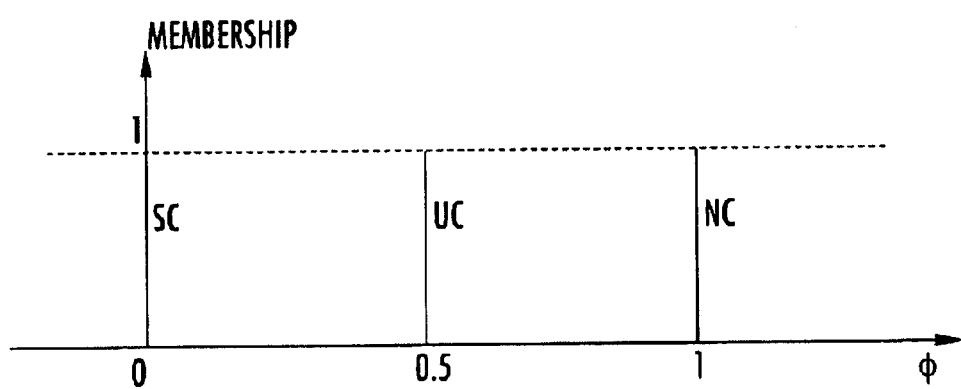
FIG. 9 is a graph of the discourse of a fuzzy output variable which has been divided into three fuzzy sets.

The fuzzy rules used in step 22 of FIG. 2 are a special case of the general expression in equation (2) where $G^1$ is a singleton fuzzy set. In step 24 of FIG. 2 output of the fuzzy reasoning engine represents a confidence about the existence of wireless links in the communication channel. In this embodiment, a discourse of fuzzy output variable ø has been divided into three singleton fuzzy sets as shown in FIG. 9. The corresponding fuzzy linguistic variables for the fuzzy output variable φ are represented by strong confidence, SC, uncertain, UC, and no confidence, NC. The fuzzy linguistic variables for fuzzy output ø can be denoted as:

$$S(\emptyset) = \{SC, UC, NC\} = \{F_\emptyset^1, F_\emptyset^2, F_\emptyset^3\} \quad (7)$$

The fuzzy rules can be expressed as:

$$R^{l,m}: \text{IF t is } F_t^l \text{ and } \delta_t \text{ is } F_\delta^m \text{ THEN } \emptyset \text{ is } F_\emptyset^{n(l,m)} \quad (8)$$

where l,m,n(l,m)∈I, I={1,2,3} and the relationship n(l,m) can be nonlinear. It will be appreciated that the confidence can be used to represent other network parameters such as the existence of wired links, and the numbers and type of fuzzy linguistic variables can be altered to better represent the network statistical values.

Table 1 illustrates a description of the fuzzy rules. Fuzzy linguistic variables small, S, medium, M and large, L, for mean t, are represented in columns 50–52 respectively. Fuzzy linguistic variables small, S, medium, M and large, L for variance $\delta_t$ are represented by rows 53–55. Fuzzy output φ is represented by the fuzzy linguistic variables shown in columns 50–52 and rows 53–55.

TABLE 1

| | | t | | |
|---|---|---|---|---|
| | | 50 | 51 | 52 |
| | $\delta_t$ | S | M | L |
| 53- | S | NC | NC | UC |
| 54- | M | NC | UC | UC |
| 55- | L | NC | SC | SC |

For example, the rule shown in column 50 and row 53 states that: IF mean t is S and variance $\delta_t$ is S, THEN fuzzy output ø is NC. This rule means that if both the mean value and the variance of measured RTTs are small then there is no confidence about the existence of wireless links in the communication channel. Another example of a rule shown in column 52 and row 53 states that: IF t is L and $\delta_t$ is S THEN ø is UC. This rule means that even if the variance, $\delta_t$, of RTTs is small but the mean value, t, of RTTs is large, the existence of wireless links is still uncertain because it is possible that all the test RTTs packets get lost and all the RTTs have been set as the timeout values.

Fuzzy reasoning can be expressed for each fuzzy input pair t and $\delta_t$, and the corresponding fuzzy set F of the fuzzy output ø has membership function as represented:

$$\mu(\phi) = \perp_{l,m \in I} \left( \diamond \left( \mu_{F_t^l}(t), \mu_{F_\delta^m}(\delta_t), \mu_{F_\phi^{n(l,m)}}(\phi) \right) \right) \quad (9)$$

Where "⊥" is a the decompositional operator, and "◇" is a compositional operator. In this disclosure "max" is used as the de-compositional operator and "min" as the compositional operator. Then equation (9) can be rewritten as follows.

$$\mu(\phi) = \text{Max}_{l,m \in I} \left( \text{Min} \left( \mu_{F_t^l}(t), \mu_{F_\delta^m}(\delta_t), \mu_{F_\phi^{n(l,m)}}(\phi) \right) \right) \quad (10)$$

The method of gravity-of-mass (GOM) is used to perform defuzzification, in step 26 of FIG. 2. It can be expressed as:

$$\phi = \frac{\int \phi \mu_F(\phi) d\phi}{\int \mu_F(\phi) d\phi} \quad (11)$$

Because the fuzzy output sets are singleton ones, the description of fuzzy reasoning and defuzzification can be simplified and combined together where core($F_\emptyset^{n(l,m)}$) represents the core value of the fuzzy set $F_\emptyset^{n(l,m)}$ as:

$$\phi = \frac{\sum_{l,m=1}^{3} \mu_{F_t^l}(t) \mu_{F_\delta^m}(\delta_t) core(F_\phi^{n(l,m)})}{\sum_{l,m=1}^{3} \mu_{F_t^l}(t) \mu_{F_\delta^m}(\delta_t)} \quad (12)$$

A threshold of confidence values can be used for determining if wireless links exist. For example, it can be determined that if fuzzy output, φ, is greater than 0.7 then wireless links exist and if fuzzy output φ is less than 0.3 then wireless links do not exist.

Simulations were performed with parameters set forth as follows. For each simulation 100 consecutive RTT values were measured by step 12. A mean value and variance of each of the 100 RTTs were computed as the input data. When there are wireless links in the communication channel, $T_o$, is set as 140 ms; otherwise, $T_o$ is set as 100 ms. A Proxim spread spectrum wireless LAN was used in the wireless case. A wireless laptop with RangeLAN2 7400 PC card communicates via the RangeLAN2 7510 Ethernet Access Point as the base station to the LAN. It is appreciated that wireless products from other companies should demonstrate similar stititstical patterns to those found with the simulations.

The mean values of Gaussian membership functions of the fuzzy linguistic variables $S_t$, $M_t$, $L_t$ are 10, 50, 90 respectively.

The variances of Gaussian membership functions of the fuzzy linguistic variables $S_t$, $M_t$, $L_t$ are each 20.

The mean values of Gaussian membership functions of the fuzzy linguistic variables $S_\delta$, $M_\delta$, $L_\delta$ are 10, 20, 30 respectively.

The variances of Gaussian membership functions of the fuzzy linguistic variables $S_\delta$, $M_\delta$, $L_\delta$ are all 3.

Figure 10A:
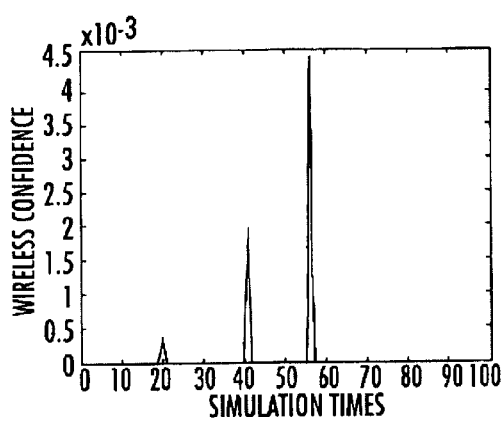
FIG. 10a is a graph of simulation results of a LAN session without wireless links.
Figure 10C:
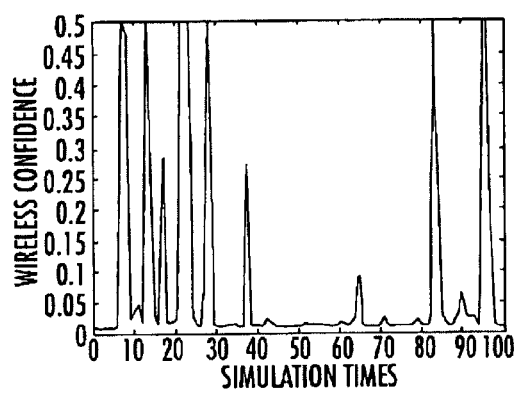
FIG. 10c is a graph of simulation results of an Internet session without wireless links.
Figure 10B:
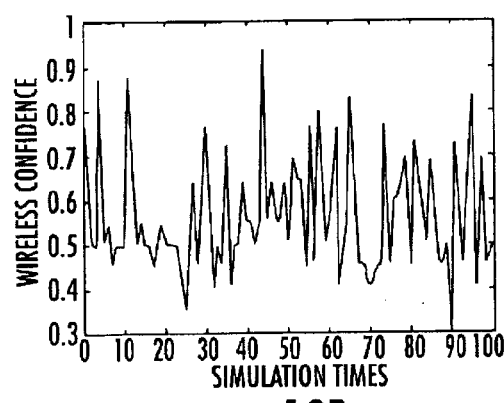
FIG. 10b is a graph of simulation results of a LAN session with wireless links.
Figure 10D:
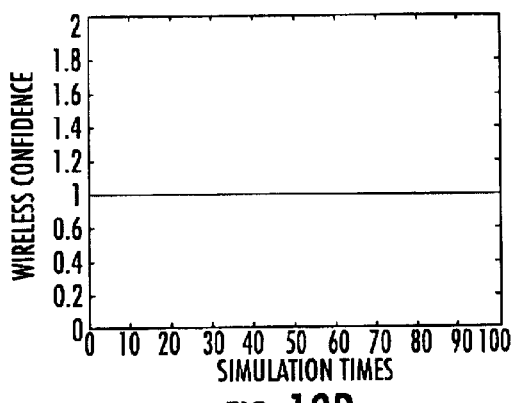
FIG. 10d is a graph of simulation results of an Internet session with wireless links.
Figure 11:
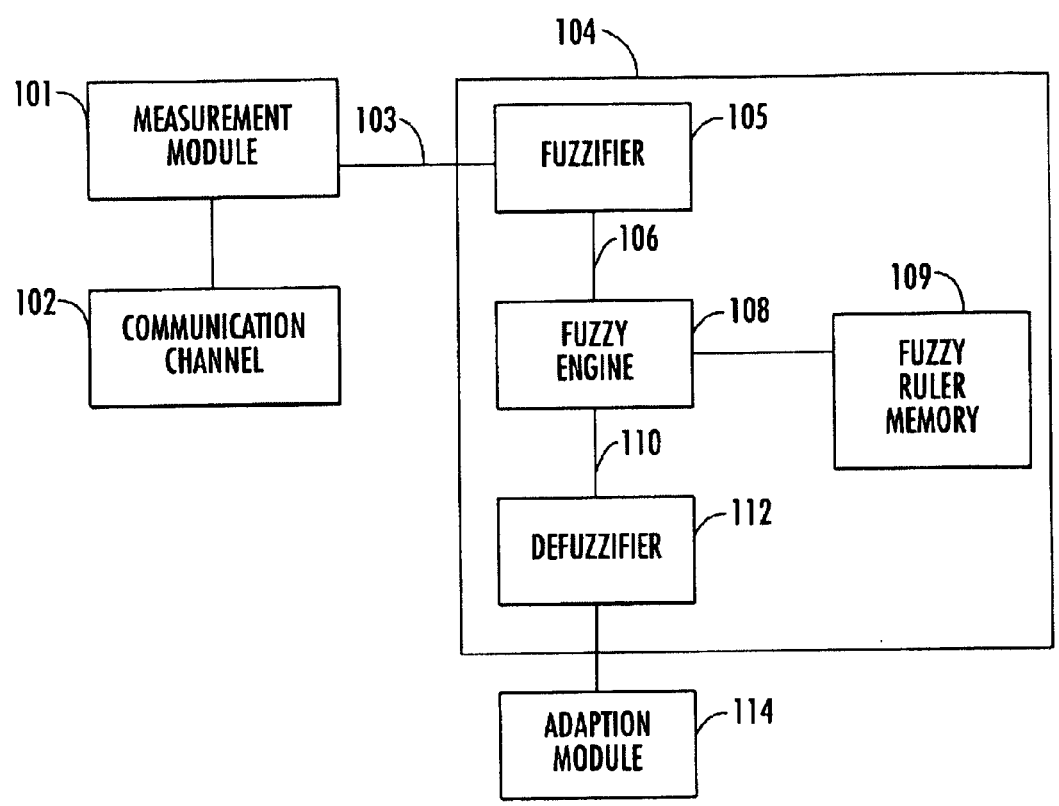
FIG. 11 is a schematic diagram of a system for adapting a network application.

The above values parameterize fuzzifier 105 shown in FIG. 11 and determine the shape of the membership functions of the fuzzy linguistic variables $S_t$, $M_t$, $L_t$, $S_\delta$, $M_\delta$ and $L_\delta$ in FIG. 8. Columns 50–52 and rows 53–55 itemize tfuzzy rule memory 109 shown in FIG. 11. Equations (10) and (11) specify fuzzy engine 108 and defuzzifier 112 shown in FIG. 11. FIGS. 10A–D are the simulation results.

FIG. 10a illustrates simulation results for a LAN session without wireless links. FIG. 10b illustrates simulations results for a LAN session with wireless links. FIG. 10c illustrates results for an Internet session without wireless links. FIG. 10d illustrates an Internet session with wireless links. In evaluating the simulation results a confidence of greater than 0.7 was used to indicate the existence of wireless links, a confidence of less than 0.3 was used to indicate no existence of wireless links and a confidence in the range of 0.3 to 0.7 was used to indicate that it is uncertain if wireless links exist. FIG. 10a illustrates a confidence of less than 0.3 of all values of the simulation to determine a LAN session without wireless links. FIG. 10d illustrates a confidence of greater than 0.7 for all values of the simulation to determine an Internet session with wireless links. FIGS. 10b and 10c have a range of wireless confidence between 0.3 to 0.7 in which it is uncertain if wireless links exist. Additional measurements can be used in the simulation represented by FIGS. 10b and 10c to determine if a conclusion can be reached on the existence of wireless links. For example, if results of two additional measurements are still in the uncertain range it is assumed wireless links exist. Otherwise, the previous uncertain measurement is regarded as transient and the new result of strong confidence or no confidence is used to determine the existence of wireless links.

FIG. 11 is a schematic diagram of a system for adapting a network application 100. Statistical parameter measurement module 101 measures quality of service parameters of a communications channel 102. For example, network statistical parameter module 101 measures round trip times of a plurality of packets sent from a first communication entity to a second communication entity over communication channel 102 to form input data 103. Fuzzy logic control system 104 includes fuzzifier module 105 that receives input data 103 and translates input data 103 into fuzzy input data 106. Fuzzy input data 106 is received at fuzzy engine 108. Fuzzy engine 108 processes fuzzy input data 106 in accordance with at least one fuzzy rule stored in fuzzy rule memory 109 to provide fuzzy output data 110. Fuzzy output data 110 is received at defuzzifier module 112 to convert fuzzy output data 110 to a confidence of a type of communication link for determining a type of communication link. Application adaption moduel 114 adapts an application based on the determined type of link.

Figure 12:
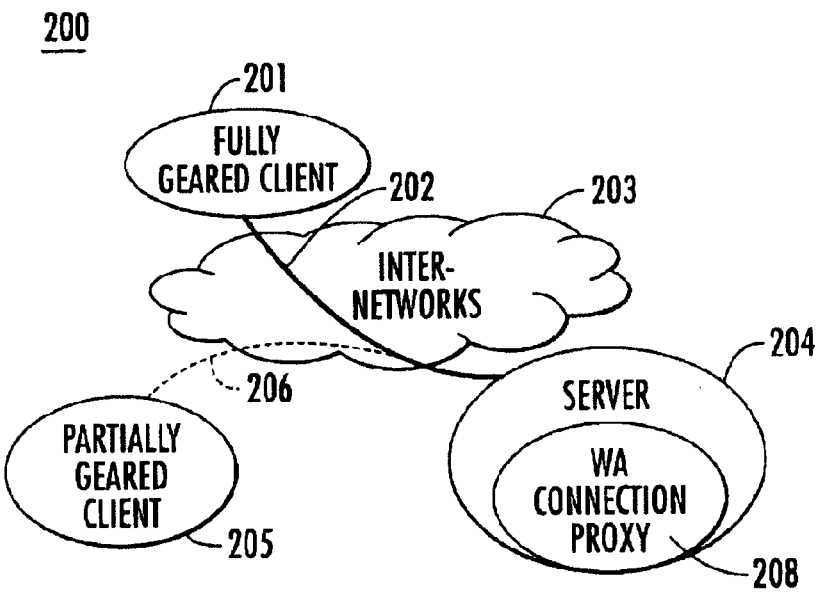
FIG. 12 is a schematic diagram of a unicast client/server paradigm.

Method 10 can be used in application scenarios to adaptively modify the application based on the existence or nonexistence of wireless communications links. FIG. 12 illustrates application of method 10 in a unicast client/server paradigm 200. In an ideal environment of a client/server paradigm, the server side of the application handles all common processing, and the client side handles all user-specific processing. Examples of use of the client/server paradigm in conventional Internet applications include web browsing, email, ftp, telnet, and the like. Client 201 communicates over wired communication channel 202, which includes one or more wired communication links within internetwork 203 to server 204. Client 205 communicates over wireless communication channel 206 which includes one or more wireless communication links to server 204. Wireless awareness proxy gateway 208 in server 204 performs method 10.

When client 201 or client 205 requests a connection or service to server 204, it communicates with wireless awareness proxy gateway 208. Wireless awareness proxy gateway 208 performs step 12 to measure a network statistical parameter of wired communication channel 202 and wireless communication channel 206, such as the RTT and performs step 14 to determine a confidence about the existence of wireless links. Server 204 performs step 16 and adapts the network based application based on the conclusion drawn about the existence of wireless links by wireless awareness proxy gateway 208. Server 204 can provide different levels of quality of service (QoS) based upon the existence of wireless links. For example, a live video server can send high-resolution video streams to client 201 which is connected to server 204 with wired communication channel 202, referred to as a fully-geared client and normal or low-resolution video streams to client 205 which is connected to server 204 with wireless communication channel 206, referred to as a partially-geared client, adapting the application, thereby, to the limited bandwidth, high packet loss rate, and stringent power constraints of the wireless link.

Figure 13:
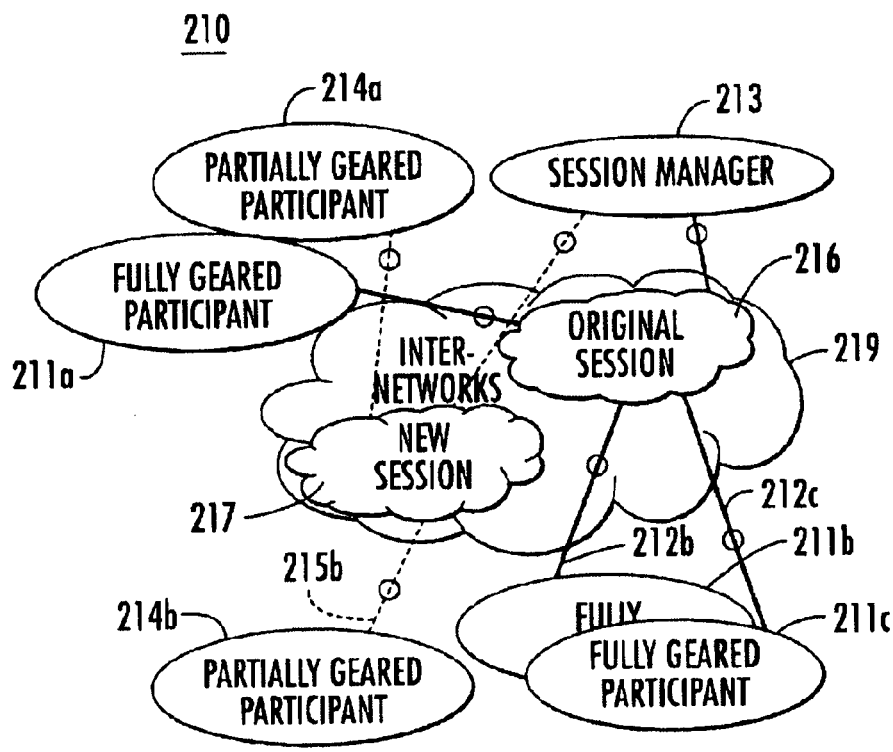
FIG. 13 is a schematic diagram of a multicast paradigm.

FIG. 13 illustrates application of method 10 in a multicast paradigm 210. The multicast paradigm is used when the application features a plurality of participants. In the conventional multicast paradigm, network resources such as bandwidth are used in an efficient way by reducing the number of datagram copies transmitted in the network. However, if one of the participants communicates with the multicast session via a wireless link and the application is not aware of it, then the data channel to that participant can easily get congested so that the performance of the application will be degraded, especially for that participant. For example, in a videoconferencing scenario, some participants may be using mobile devices such as wireless laptops and pen-based computers. As more participants join the session, the video streams to the mobile devices will experience unacceptable delays and jitter if the rate-control by the codec of the videoconferencing application is not aware of the existence of the wireless links and does not adapt to them by using lower transmission rates.

Clients 211a–c communicate over respective wired communication channels 212a–c within internetwork 219 to session manager 213. Clients 214a and 214b communicate over respective wireless communication channels 215a–b within internetwork 219 to session manager 213. Session manager 213 performs method 10 to determine if clients 211a–c or clients 214a–b wanting to join a session have wireless links. Session manager 213 performs step 12 of FIG. 1 to measure a network statistical parameter such as RTT of the respective wired communication channel 212a–c or wireless communication channel 215a–b and performs step 14 of FIG. 1 to determine the existence of wireless links. In this example, original session 216 is announced by session manager 213. Thereafter, clients 211a–c and 214a–214b can communicate with session manager 213 to join the session. If all clients 211a–c request to join a session, session manager 213 determines clients 211a–c have wired communication links, referred to as fully-geared clients, and connects them to original session 216. If both clients 214a and 214b request to join a session, session manager 213 determines clients 214a and 214b have wireless links, referred to as partially-geared clients. Session manager 213 creates new session 217 for clients 214a and 214b and requests clients 214a and 114b join new session 217. Thereafter, session manager 213 receives traffic stream 218 from original session 216 and converts it to a traffic stream 219 usable in new session 217. Accordingly, every participant can send its data stream to and receive the data streams from others via the corresponding multicast session.

A suitable application of multicast paradigm 210 is a video conferencing session. After session manager 213 announces the videoconferencing session, participants can join, send and receive the live video streams. Session manager 213 performs the following steps during the videoconferencing session:

creates new multicast session 217 for clients 214a and 214b which are participants communicating via wireless channels, such as those using mobile laptops;

notifies videoconferencing applications running on the mobile laptops of clients 214a and 214b to send and receive low-resolution video streams instead of normal ones;

receives normal-resolution video streams from participants in original session 216, converts the normal resolution video streams into low-resolution streams and sends the low resolution video streams to new session 217; and receives low-resolution video streams from new session 217, converts the low resolution video streams into normal-resolution streams and sends the normal resolution video streams to the original session. Accordingly, video traffic is properly adjusted for the wireless links so to avoid congestion, and all the participants can receive acceptable video streams except for the resolution difference between the fully and partially geared participants.

It is to be understood that the above-described embodiments are illustrative of only a few of the many possible specific embodiments which can represent applications of the principle of the invention. Numerous and varied other arrangements can be readily devised in accordance with these principles by those skilled in the art without departing from the spirit and scope of the invention.

What is claimed is:

1. A computer implemented method for adapting a network based application comprising the steps of:

determining input data as numeric data representative of at least one network statistical parameter of an intermediate communication link in an end-to-end communication channel;

determining fuzzy rules to determine the degree of membership of said input data in fuzzy input data using a singleton fuzzifier or a nonsingleton fuzzifier to determine a membership function for said fuzzy input data;

determining fuzzy output data from said input data and said fuzzy input data according to said determined fuzzy rules;

processing said fuzzy output data for determining a confidence of a type of said communication link as either a wired or wireless communication link; and adapting said network based application based on said confidence of a determined type of said communication link as either a wired or wireless communication link.

2. The method of claim 1 wherein said fuzzy input data comprises at least one fuzzy linguistic variable.

3. The method of claim 1 wherein a singleton fuzzifier is used to determine said membership function.

4. The method of claim 1 wherein a nonsingleton fuzzifier is used to determine said membership function.

5. The method of claim 1 wherein said network statistical parameter is a mean of a round trip time of a packet sent from a first entity and received by a second entity over said communication channel.

6. The method of claim 1 wherein said network statistical parameter is a variance of a round trip time of a packet sent from a first entity and received by a second entity over said communication channel.

7. The method of claim 1 wherein said application is adapted to provide a predetermined quality of service.

8. A system for adapting a network based application comprising:

means for determining input data as numeric data representative of at least one network statistical parameter of an intermediate communication link in an end-to-end communications channel;

a fuzzifier module using a singleton fuzzifier or a nonsingleton fuzzifier to determine a membership function for at least one fuzzy rule for determining fuzzy input data from said input data;

means for determining fuzzy output data coupled to said fuzzifier module for processing said input data and said fuzzy input data according to said at least one fuzzy rule to provide said fuzzy output data to determine the degree of membership of said input data in fuzzy input data; and a defuzzifier module for converting said fuzzy output data into a confidence of a type of said communication link as either a wired or wireless communication link; and means for adapting said network based application based on said determined type of said communication link.

9. The method of claim 8 wherein said fuzzy input data comprises at least one linguistic variable.

10. The system of claim 8 wherein a singleton fuzzifier is used to determine said membership function.

11. The system of claim 8 wherein a nonsingleton fuzzifier is used to determine said membership function.

12. The system of claim 8 wherein said network statistical parameter is a mean of a round trip time of a packet sent from a first entity and received by a second entity over said communication channel.

13. The system of claim 8 wherein said network statistical parameter is a variance of a round trip time of a packet sent from a first entity and received by a second entity over said communication channel.

14. The system of claim 8 wherein said application is adapted to provide a predetermined quality of service.

15. A computer implemented method of determining the existence of at least one wireless link in an end-to-end communication channel comprising the steps of:
- determining input data as numeric data representative of at least one network statistical parameter of an intermediate communication link in an end-to-end communication channel; and
- determining fuzzy rules to determine the degree of membership of said input data in fuzzy input data using a singleton fuzzifier or a nonsingleton fuzzifier to determine a membership function for said fuzzy input data;
- determining fuzzy output data from said input data and said fuzzy input data according to said determined fuzzy rules; and
- processing said fuzzy output data for determining a confidence,
- wherein said fuzzy output data is a confidence of the existence of said wireless link in said communication channel; and
- determining the existence of at least one wireless link in said communication channel based on said confidence.

16. The method of claim 15 wherein said step of determining input data comprises the steps of:
- assigning an identification to a handshake packet transmitted from a first communication entity over said communication channel to a second communication entity;
- recording a sending time instant at said first communication entity when said handshake packet is sent;
- transmitting said handshake packet to said second communication entity;
- returning said handshake packet from said second communication entity to said first communication entity;
- computing a roundtrip time as the difference between a receiving time instant of when the said transmitted handshake packet is received at said first communication entity and said sending time instant; and
- determining a mean value and a variance of said computed round trip time as said input data.

17. The method of claim 15 wherein said fuzzy input data comprises at least one fuzzy linguistic variable.

18. The method of claim 15 wherein a singleton fuzzifier is used to determine said membership function.

19. The method of claim 15 wherein a nonsingleton fuzzifier is used to determine said membership function.

20. A computer implemented method for unicast communication between a first communication entity and a second communication entity over an end-to-end communication channel comprising the steps of:
- requesting at said first communication entity a service to be performed at said second communication entity, by sending a request over said communication channel;
- determining input data as numeric data representative of at least one network statistical parameter of one or more communication links in said communication channel;
- determining fuzzy rules to determine the degree of membership of said input data in fuzzy input data using a singleton fuzzifier or a nonsingleton fuzzifier to determine a membership function for said fuzzy input data;
- determining fuzzy output data from said input data and said fuzzy input data according to said determined fuzzy rules;
- processing said fuzzy output data for determining a confidence of a type of said communication link as either a wired or wireless communication link; and
- providing a predetermined quality of service at said second communication entity based on the determination of said confidence of said type of communication link as either a wired or wireless communication link.

21. A system for unicast communication between a first communication entity and a second communication entity comprising:
- a communication channel having one or more communication links connecting said first communication entity to said second communication entity;
- a proxy gateway in communication with said second communication entity;
- said proxy gateway determining input data as numeric data representative of at least one network statistical parameter of a communication link in said communication channel;
- a fuzzifier module using a singleton fuzzifier or a nonsingleton fuzzifier to determine a membership function for at least one fuzzy rule for determining fuzzy input data from said input data;
- means for determining fuzzy output data coupled to said fuzzifier module for processing said input data and said fuzzy input data according to said at least one fuzzy rule to provide said fuzzy output data to determine the degree of membership of said input data in fuzzy input data; and
- a defuzzifier module for converting said fuzzy output data into a confidence of a type of communication link as either a wired or wireless communication link;
- providing a predetermined quality of service at said second communication entity based on the confidence of said type of communication link as either a wired or wireless communication link.

22. A computer implemented method for multicast communication between a plurality of communication entities comprising the steps of:
- requesting at each of said plurality of communication entities a connection to a multicast session over a communication channel;
- determining input data as numeric data representative of at least one network statistical parameter of one or more communication links in said communication channel;
- determining fuzzy rules to determine the degree of membership of said input data in fuzzy input data using a singleton fuzzifier or a nonsingleton fuzzifier to determine a membership function for said fuzzy input data;
- determining fuzzy output data from said input data and said fuzzy input data according to said determined fuzzy rules;
- processing said fuzzy output data for determining a confidence of a type of said communication link as either a wired or wireless communication link;
- connecting said communication links determined to have said confidence of said type of communication link as a wired link to a first session;
- connecting said communication links determined to have said confidence of said type of communication link as a wireless link to a second session; and
- converting communication data being sent to said first session to communicate data useable in said second session.

23. A system for multicast communication between a plurality of communication entities each said communication entity connecting over an end-to-end communication channel comprising:

a session manager determining input data as numeric data representative of at least one network statistical parameter of a communication link in a communications channel, a fuzzifier module using a singleton fuzzifier or a nonsingleton fuzzifier to determine a membership function for determining fuzzy input data from said input data;

means for determining fuzzy output data coupled to said fuzzifier module for processing said input data and said fuzzy input data according to at least one fuzzy rule to provide said fuzzy output data to determine the degree of membership of said input data in fuzzy input data; and a defuzzifier module for converting said fuzzy output data into said confidence;

means for providing a predetermined quality of service at said second entity based on the determination of said confidence of said type of communication link, connecting said communication links determined to have said confidence of said type of communication link as a wired link to a first session, connecting said communication links determined to have said confidence of said type of communication link as a wireless link to a second session; and converting communication data being sent to said first session to communicate data useable in said second session.

* * * * *